United States Patent [19]
Tanaka

[11] 3,804,236
[45] Apr. 16, 1974

[54] PROTECTIVE HOLDER FOR SOFT CONTACT LENS

[75] Inventor: Kyoichi Tanaka, Chikusa-ku, Japan

[73] Assignee: Toyo Contact Lens Co., Ltd., Nagoya, Japan

[22] Filed: Oct. 13, 1972

[21] Appl. No.: 297,340

[52] U.S. Cl. .......................... 206/205, 206/5.6
[51] Int. Cl. ............................................ A45c 11/04
[58] Field of Search......... 138/137, 166 R; 206/5 A, 206/65 F; 220/23.83

[56] References Cited
UNITED STATES PATENTS

| | | | |
|---|---|---|---|
| 3,343,657 | 9/1967 | Speshyock | 206/5 A |
| 3,367,481 | 2/1968 | Tanaka | 206/5 A |
| 3,091,328 | 5/1963 | Leonardos | 206/5 A |
| 3,211,281 | 10/1965 | Speshyock et al. | 206/5 A |
| 3,552,548 | 1/1971 | Wallestad | 206/65 F X |

Primary Examiner—William T. Dixson, Jr.
Assistant Examiner—Steven E. Lipman
Attorney, Agent, or Firm—Donald Gunn

[57] ABSTRACT

A protective holder for a soft contact lens, which holds the lens against any undesirable displacement during storage in a container when it is not being worn, keeps the lens in a sterile condition, and protects the lens against being damaged during insertion into or removal from the container.

This invention relates to a holder which keeps a soft contact lens safe from being scratched when it is put into or taken out of a case, and which keeps the lens clean when it is held within the case.

7 Claims, 9 Drawing Figures

PATENTED APR 16 1974    3,804,236

PROTECTIVE HOLDER FOR SOFT CONTACT LENS

BACKGROUND OF THE INVENTION

Soft contact lenses must be preserved under the conditions similar to those when placed between the eyeball and eyelid, that is, the lenses should be soaked in a germicidal wetting solution to maintain their plasticity and to keep them in a sanitary condition through sterilization within a case.

Various protective holders for soft contact lenses have been suggested to meet the above-mentioned demands, but they have had defects. The holders are formed only to hold the lenses at the concavities inside the holders, therefore, the lenses inevitably cling to the concavities while they are kept within the cases. For that reason it is difficult to take the lenses out of the holders, and the lenses are apt to be damaged during removal from the holders. In addition, since the holders are supported by the lid of the case, the lenses are in danger of being damaged by striking against the case during insertion to the holder. Further, when the contact lenses are taken out of the case, the inside of the case may be contaminated by miscellaneous bacilli from the fingers which touch the inner surface of the case or the germicidal wetting solution in the case.

SUMMARY OF THE INVENTION

It is a primary object of this invention to provide a holder which protects a soft contact lens from damage, including scratched surfaces and drying and to provide a holder which does not scratch the lenses during removal from the case. A further object of this invention is to provide a holder keeping the germicidal wetting solution in the case and the case itself from pollution by fingers and the like when the lenses are put into or taken out of the case, so that the lenses can be stored in the holder repeatedly without the necessity of washing the case and replacing the germicidal wetting solution.

The protective holder according to this invention comprises a cylindrical support having almost the same inside diameter and length as the outside diameter of the lens with at least one end of the cylindrical support open. The surface of the lens in the cylindrical support is held in touch with the inner surface of the support, and as a rule, the support is positioned horizontally on a column upstanding from a circular base. In this case, the diameter of the base should be larger than the length of the cylindrical support. The protective holder as described above is inserted in a bottomed tubular case through the opening of the case. The case may contain a germicidal wetting solution for the lens therein, and the opening of the case is sealed with a lid. Then the base of the protective holder is fixed on the open end of the case with the lid, keeping the lens in the case. However, it will be possible to screw or otherwise fix the support to the column at the inside of the lid, while the base is omitted.

According to this invention, the soft contact lens is put into and taken out of the case without being damaged, and when putting the lens into or taking it out of the case, the lens and the inside of the case are not contaminated. The lens stored in the case in this manner will be kept sanitary because it is immersed in the germicidal wetting solution. Since the span between the open edge of the cylindrical support and the inner surface of the case is small, the lens is held within the case without crashing against the inner surface of the case in cooperation with the damping function of the germicidal wetting solution even if the case is struck. In particular, because of the open edge of the support, the germicidal wetting solution can flow well therein; accordingly the germicidal wetting solution acts quite effectively to keep the lens in a sterile condition, and the lens can be easily put into or taken out of the protective holder.

This invention may be best understood by way of the following description of the embodiment as illustrated in the accompanying drawings.

DESCRIPTION OF THE PREFERRED EMBODIMENTS

Figure 1:
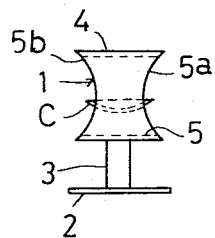
FIG. 1 shows a front view of an embodiment according to this invention.
Figure 2:
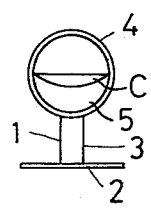
FIG. 2 shows a side view of FIG. 1.
Figure 5:
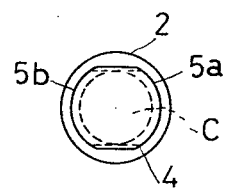
FIG. 5 is a plan view of FIG. 1.

According to FIG. 1, 2 and 5, the protective holder 1 for a soft contact lens C is formed as a body connected to a disc-shaped base 2 made of selected plastic or metal and has a column 3 having an arcuately cut upper end upstanding from the center of the disc-shaped base 2. A cylindrical support 4 is set on the arcuate upper end of the column 3 and supports the lens C. The cylindrical support 4 is arcuately cut to open at both ends 5a and 5b, and the breadth of the support 4 and the diameter of the bore 5 of the support 4 are set substantially equal to the outside diameter of the contact lens C. While the exterior is subject to variation in shape, the interior is best circular in cross-section. Accordingly, the lens C is inserted into the bore 5 from either edge of the support 4, and the lens inserted in the bore 5 is supported on the inner surface of the support 4.

Figure 3:
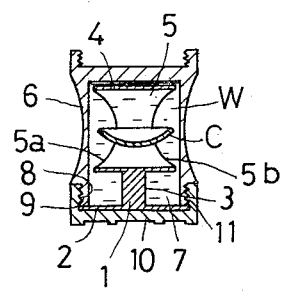
FIG. 3 shows a vertical sectional view of the protective holder contained in a single-chamber case.

As shown in FIG. 3, a single-chamber tubular case 6 made of a selected plastic or metal is open at one end 8, and closed at the other end, and defines a holder container 7 having a circular transverse section. The inside diameter of this container 7 is somewhat larger than the outside diameter of the lens C. A helical thread 9 is provided at the outer periphery of the open end 8 of the case 6. A lid 10 provided with a mating helical thread 11 therein is fitted around the open end 8 of the case 6, and secured thereto by engagement of the threads 9 and 11. The base 2 of the protective holder 1 is inserted within the lid 10, and the outer periphery of the base 2 is pressed against the edge of the open end 8 of the case 6 by the inner surface of the lid 10. Therefore, the protective holder 1 is secured fast inside the case 6. W indicates a germicidal wetting solution filling the case 6.

Figure 4:
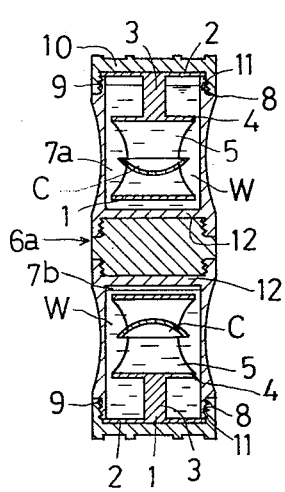
FIG. 4 is a vertical sectional view of the protective holders placed in a double-chamber case.

The embodiment of FIG. 4 shows a double-chamber case 6a which includes two single-chamber cases 6 joined together with a partition 12 between them. On both sides of the partition 12 the right container 7a and the left container 7b (shown up and down in FIG. 4) are formed respectively.

The functions of the above embodiment are set out below. First, the lens C is inserted in the bore 5 of the protective holder 1 with the base 2 fitted within the lid 10, through either of the open ends 5a or 5b. Then, the protective holder 1 is inserted in the container 7 of the case 6 filled with the germicidal wetting solution W, and the base 2 of the protective holder 1 is locked at the open end 8 of the case 6, while the lid 10 is threaded to the case 6. As shown in FIG. 3, the base 2 does not fit inside the case, but rather, it sits on the lip of the open end of the case 6.

As to the double-container case 6a as shown in FIG. 4, the container 7a and the container 7b each store a soft contact lens C therein in the same manner as stated above.

As described above, the space between the lens C in the bore 5 of the protective holder 1 or both edges 5a and 5b of the bore 5 and the inner surface of the case, is small or narrow. Therefore, even if the soft contact lens C were to slide out from the cylindrical support 5, the lens C does not drop out, contacting the inner surface of the case with the lens edge, after only little movement. In other words, the soft contact lens C remains almost immovable in the case. It is preserved hygienically, being washed and sterilized by the germicidal wetting solution W. As both ends of the cylindrical support 4 are open, the germicidal wetting solution W in the containers 7, 7a or 7b may unrestrictedly flow through the bore 5. Accordingly, the washing effect is improved all the more.

Meanwhile, in case of taking the soft contact lens C out of the case, the lid 10 is first detached from the case, the base 2 with the protective holder 1 is pulled out of the case by grasping its exposed edge, and then the lens C is easily lifted from either of the open ends 5a and 5b of the support 4 by pinching the edge of the lens C. When removing the lens from the case, the fingers need not touch the support 4 of the protective holder 1, the open end of the case or the germicidal wetting solution. Therefore, the insertion and removal of the lens can be done under very hygienical conditions.

Figure 6:
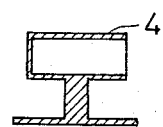
FIG. 6 — FIG. 9 are side views of several other embodiments according to this invention.
Figure 7:
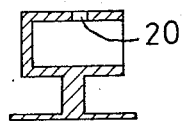
Figure 8:
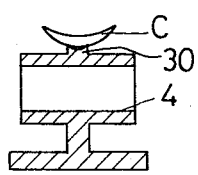
Figure 9:
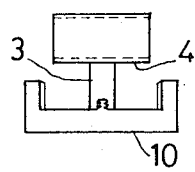

Though both ends of the cylindrical support 4 in the above embodiment are open, and arcuately curved, it will be acceptable to open only one end and cut the open end straightly as shown in section in FIG. 6. A modification as shown in FIG. 7 has one end of the cylindrical support open and the other closed, and has at least one vent or hole 20 through the wall of the support to make the germicidal wetting solution flow in or out more effectively. A modification in FIG. 8 shows a protective holder having a contact lens mount 30 jutting out from the top of the support 4 and having its upper surface curved to closely match the curved surface of the lens to support the lens. The mount 30 is an aid in placing the contact lens C in the eye without using the fingers. FIG. 9 shows another modification in which the column 3 of the protective holder is screwed or otherwise attached to the inside of the lid 10 of the case 6.

Clearance has not been specified and may be varied. However, clearance in the range of about 1 millimeter is believed adequate in most cases. It can be reduced. Clearance refers to the difference in size in the lens, the bore 5 and in the cavity in the container 7.

The foregoing constitutes a description of the preferred embodiments but the scope thereof is determined by the claims which are as follows:

I claim:

1. A protective holder for a soft contact lens comprising a hollow cylindrical support having two ends of which at least one end is open and which is adapted to receive a lens therein, the inside diameter and length of said cylindrical support being slightly larger than the diameter of said contacts lens whereby said lens may be supported between opposed inner surfaces of said cylindrical support to keep the lens in sterile condition and to protect the lens against damage during insertion into and removal from said cylindrical support, a column connected to said cylindrical support, a base attached to said column, a hollow container receiving and closing said support therein enabling said support to emerse the lens in a fluid in said container, and base means further enabling removal of said support and the lens while protecting the fluid therein against finger contact.

2. The invention as claimed in claim 1 in which the open end of said cylindrical support is curved.

3. The invention as claimed in claim 1 in which the open end of said cylindrical support is straight.

4. The invention of claim 1 wherein at least one vent is located in said cylindrical support.

5. The invention of claim 1 wherein said support has an attached contact lens mount.

6. The apparatus of claim 1 wherein said base means includes an an outer edge which can be finger grasped and which is sufficiently large so as not to fit within said container and further including a lid which closes over said container and fixedly traps said base on closure, and said container is larger in diameter than the lens to be placed therein.

7. The apparatus of claim 6 including joinder means for securing two such containers together.

* * * * *